Sept. 19, 1961 D. R. DRYDEN 3,000,667
FOLDING FISHING CHAIR WITH FISHING ACCESSORY MEANS
Filed April 4, 1958

INVENTOR.
DALE R. DRYDEN
BY
James D. Wolfe
ATTORNEY ns
3,000,667
FOLDING FISHING CHAIR WITH FISHING ACCESSORY MEANS Dale R. Dryden, 1219 NW. 10th, Oklahoma City, Okla.; said Dryden assignor of one-half to A. E. Warnberg, Oklahoma City, Okla.
Filed Apr. 4, 1958, Ser. No. 726,492
3 Claims. (Cl. 297—45)

This invention relates to a novel folding chair having means for holding and carying a fishing rod and similar handle equipment and other fishing accessories. More particularly, this invention relates to a novel laterally folding chair having arms, a fabric seat and back and means for holding and carrying a fishing rod, umbrella and other fishing accessories.

Nearly everyone has observed the way fishermen improvise seats and means for holding their fishing rod or pole and hunt the shade on a hot day. Although there are literally thousands on thousands of fishermen and many of them have exercised their ingenuity in this direction, still no really satisfactory, lightweight, compact portable chair having means for holding and carrying a fishing rod, an umbrella, fishing tackle and other fishing accessories is available.

Accordingly, it is a principal object of this invention to provide a portable chair having means for holding and carrying the usual fishing accessories including a fishing rod, an umbrella, tackle, etc.

Another object of this invention is to provide a portable folding chair having at least one hollow resilient cylindrical means positioned on the forepart of the chair at least as high as the seat.

A further object of this invention is to provide a portable folding chair having at least one hollow resilient cylindrical means positioned on the chair uprights and having draping pockets for holding and carrying various fishing accessories.

A still further object of this invention is to provide a portable folding chair having novel means for holding a fishing rod, an umbrella and other accessories, said chair having a fabric back which permits the fisherman to lean back sufficiently to asume a partially inclined position.

Other objects and advantages of this invention will be apparent from the description and drawings wherein.

Figure 1:
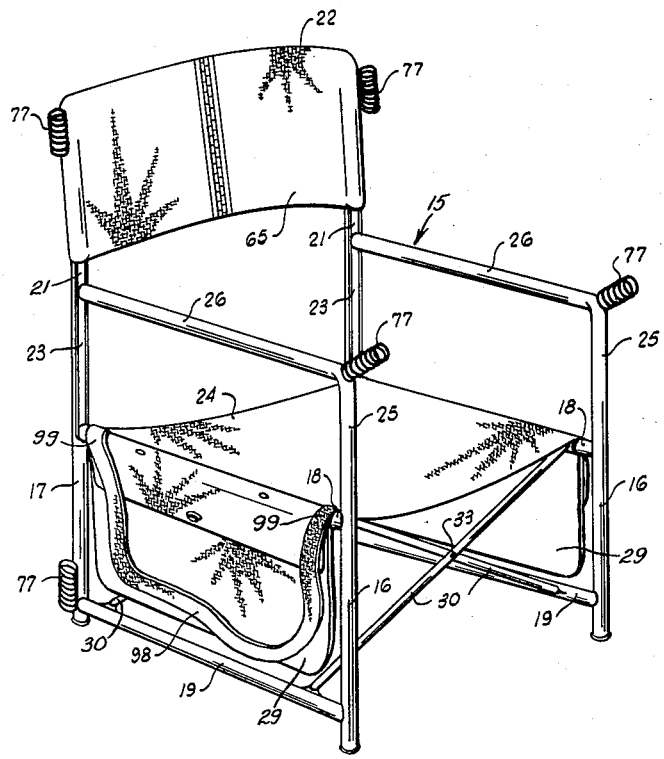
FIGURE 1 is a perspective view of the portable, folding chair of the present invention, showing the chair opened and ready for use.

Referring to the drawings in more detailed by reference numerals, 15 is a chair having two front legs 16 and two back legs 17. The front and back legs respectively are joined together by horizontal brace members called respectively seat support members 18 and ground members 19. Thus the respective front and rear legs are joined to form two lateral sides of the chair.

The rear legs 17 extend upward above a seat 24 to form the rear posts 21 as may be seen in FIG. 1. The rear posts 21 support the back member 22 between them and serve as guides for the seat support members 18. The guideways 23 are formed in the rear posts 21 by rolling or turning inward a portion of said post to form the guideway track and retaining sides.

The front legs 16 likewise extend upward above the seat 24 to form front posts 25 which support one end of the chair arms 26. In the particular embodiment illustrated in the drawings, the front legs 16, posts 25 and arms 26 are shown as a single elongated member bent at the appropriate place to give the configuration of FIG. 1.

The front posts 25 are similarly fabricated to form guideways 23 therein which correspond to those in the rear posts. If the post does not lend itself to shaping to form a rolled type groove, the guideway may be formed therein by cutting an elongated slot or groove in the respective posts, or in any other suitable manner.

When the respective front and rear legs are joined together by the horizontal brace members 18 and 19, the chair may be thought of as having two lateral sections or side frames that form the chair frame when they are joined together. The nature of the lateral sections is very clearly illustrated in FIG. 1 where the laterial sections are shown with a seat 24, draping pockets 29 and diagonal members 30. The diagonal members 30 perform the function of joining the lateral sections together to give the chair frame an integrated structure. The diagonal members 30 are shown pinned or bolted together at the point where they cross by bolt or pin 33. The ends of said diagonal members are secured pivotally to the respective lateral sides.

Figure 2:
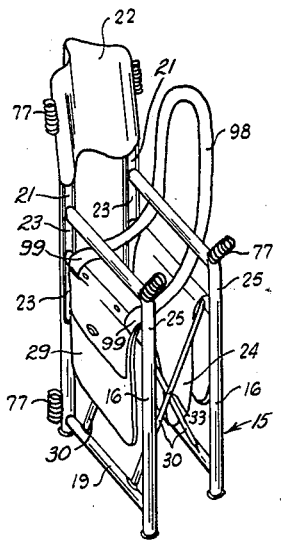
FIGURE 2 is a perspective view showing the chair in partly closed or folded position preparatory to lifting it for portage.

Since the pairs of diagonals are pinned by bolt 33 and pivotally secured to the horiontal brace members, the lateral sides of the chairs may be moved from the spread apart position of FIG. 1 to place said sides in a close together relation as illustrated in FIG. 2. In response to the movement of the lateral sides from a spaced apart to a closer together relationship, the seat support members 18 will move from the bottom of the guideways 23 upward to the top thereof. Consequently, it is evident that the movement of the lateral sides of the chair together or apart causes the diagonals to pivot about the bolt 33 and the seat support member to move up and down in the guideways: Thus, the chair may be folded for carrying or spread apart to permit a fisherman to sit in it.

Since it is desirable that the chair and its associated accessories be as light as possible, the chair frame preferably is constructed of light tubular or angle-shaped structural materials, such as magnesium, aluminum, or plastic reinforced with Fiberglas—and the seat, back, and draping pockets are made from the fabric materials— such as cotton, wood, leather, rubber and the synthetic fabrics and elastomers—such as the polyolefins, polyamides, polyamines, polyesters, polyisocyanates and copolymers of these polymers or their monomers.

The seat 24 may be composed of a rectangular piece of fabric and the lateral ends (not seen) thereof preferably are wrapped around the seat support members 18 respectively to form a loop around respective support members. The loop is sewn, riveted or otherwise fastened to the body of fabric to give the fabric a fixed position on said support members.

The draping pockets are secured to the seat 24 in any suitable manner and depend downwardly from the lateral ends thereof. The size of the pocket should be large enough to accommodate the usual assortment of tackle, bait, ice, etc.

The chair back 22 preferably is formed of one of the fabrics enumerated hereinbefore. The back 22 also is formed preferably of a rectangular fabric suspended between the rear posts 21 of the chair by wrapping the lateral ends thereof to form loops similar to those of the seat 24. The fabric back will hang taut between the posts 21 when a person sits in the chair and leans back to contact said fabric but will be loose when the chair is folded in the manner of FIG. 2.

The hollow resilient cylindrical means 77 for holding handle type fishing accessories, such as a rod or pole, etc., is shown in FIGS. 1 and 2. In these views the hollow resilient cylindrical means 77 comprises a metallic spiral spring. The spring is bolted or mounted to the curved part of the front leg 16.

It is readily apparent to any fisherman that the location of the cylindrical means 77 in relation to the front legs 16 may be varied considerably but those locations not easily reached by the hand of the fisherman when seated in the chair will be awkward and less desirable. Therefore, it is preferred to locate the cylindrical means 77 on the upper extension of the chair leg or the chair arm essentially in the vicinity of the location shown in FIG. 1 to afford the fisherman the best access to a fishing rod held in the cylindrical means 77.

A pull on the fishing line will cause the rod to move downward and thus bends the spiral spring. As the spiral spring bends, the top and bottom sections of the spring contact the rod handle and tend to increase the gripping action of the spring on said rod. Accordingly, if the pull on the fishing line is increased, the corresponding action on the spring will compress the lower section and expand the upper section of the spring to increase the gripping action on the rod. Hence the holding action of the spring on the fishing rod is enhanced by increasing the pull on the fishing line. It goes without saying that the internal diameter of the spring should not be more than a fraction of an inch larger than the fishing rod handle and will generally not be any larger than about two (2) inches and no longer than twelve (12) inches.

Also, the spirals of the springs function to retain the rod even when it is not pushed all the way down in the spring.

The chair may be equipped with additional cylindrical means 77 for holding the fishing rod while the chair is being carried or to hold an umbrella. The preferred locations of these additional cylindrical means 77 are shown best in FIG. 1 where the lower cylindrical means are positioned substantially contiguous with the ground support member 19 on the rear legs 17 and at the top of the rear posts 21. These cylindrical means 77 are used advantageously to hold the fishing rod or pole and an umbrella when the chair is being carried. Furthermore, by locating the lower cylindrical means 77 on the rear legs 17, the fisherman's body and arm protect the umbrella and fishing rod from the brush as the chair and its accessories are carried suspended from his shoulder, for instance, by the strap 98 which has its ends 99 snapped or fastened to one of the seat support members 18.

Although the handle support means 77 have been shown as a spiral metallic or the new Fiberglas plastic impregnated spring, it is obvious other hollow elongated containers may be used, but the ability of these means to hold water presents a problem.

Thus, applicant's chair with means for accommodating the usual fishing accessories is not only light—one well loaded chair weighed less than fifteen pounds with umbrella, rod, tackle, bait and coffee container—but permits the chair, fishing rod, bait, tackle, ice, etc., to be carried with both hands free to fight the underbrush or other obstructions in the way of the fisherman on the quest for a good fishing place.

What is claimed:

1. A portable, collapsible chair comprising a pair of front legs and a pair of back legs, said front and back legs each having a guideway extending vertically therealong; a first horizontal seat support member interconnecting one of said front legs to one of said back legs; a second horizontal seat support member interconnecting the other of said front legs to the other of said back legs, said horizontal seat support members having their ends fitted in said guideways for vertical movement relative to said front and back legs; a pair of parallel arms above each of said seat support members rigidly interconnecting said front and back legs; means for moving each of said seat support members vertically in its respective guideway when said arms are moved toward and away from each other whereby said chair may be collapsed into compact, portable form and, alternately, opened into operative position; a flexible seat supported by said seat support members; and a flexible carrying strap secured to one of said seat support members and of sufficient length to pass over said seat and under the arm opposed to the arm directly above the seat support member to which said carrying strap is secured whereby said arms may be biased toward each other to collapse said chair by pulling upward upon the free end of said flexible carrying strap when said strap is passed under the arm upon the opposite side of said chair from its point of connection to said chair.

2. A portable, collapsible chair as claimed in claim 1 wherein said flexible carrying strap is secured at one of its ends adjacent one end of said one seat support member and is secured at the other of its ends adjacent the other end of said one seat support member, and said strap is of a length to permit the bight thereof to be carried over the shoulder during portage of said chair without permitting said chair to touch the ground.

3. A portable, collapsible chair comprising a pair of front legs and a pair of back legs; a first horizontal seat support member interconnecting one of said front legs to one of said back legs; a second horizontal seat support member interconnecting the other of said front legs to the other of said back legs, said first and second seat support members being vertically slidable with respect to said front and back legs; a pair of parallel arms above each of said seat support members rigidly interconnecting said front and back legs; means for moving each of said seat support members vertically when said arms are moved toward and away from each other whereby said chair may be collapsed into compact, portable form and, alternately, opened into operative position; a flexible seat supported by said seat support members; and a flexible carrying strap secured to one of said seat support members and of sufficient length to pass over said seat and under the arm opposed to the arm directly above the seat support member to which said carrying strap is secured whereby said arms may be biased toward each other to collapse said chair by pulling upward upon the free end of said flexible carrying strap when said strap is passed under the arm upon the opposite side of said chair from its point of connection to said chair.

References Cited in the file of this patent

UNITED STATES PATENTS

| 1,223,884 | Johnstone | Apr. 24, 1917 |
| 1,444,014 | Truesdell | Feb. 6, 1923 |
| 1,626,333 | Fain et al. | Apr. 26, 1927 |
| 1,664,103 | Bishoff | Mar. 27, 1928 |
| 2,358,059 | Custer | Sept. 12, 1944 |
| 2,375,819 | Reid | May 15, 1945 |
| 2,608,240 | Booth | Aug. 26, 1952 |
| 2,904,215 | Mitchell | Oct. 20, 1959 |

FOREIGN PATENTS

| 788,065 | France | July 22, 1935 |